(12) United States Patent
Foglio Bonda

(10) Patent No.: US 11,045,778 B2
(45) Date of Patent: Jun. 29, 2021

(54) DOSAGE FORMS MATURATION DEVICE, MACHINE AND PROCESS FOR PRODUCING DOSAGE FORMS WITH THE DEVICE

(71) Applicant: APTSOL SRLS, Novara (IT)

(72) Inventor: Olga Foglio Bonda, Nibbiola (IT)

(73) Assignee: APTSOL SRLS, Novara (IT)

( * ) Notice: Subject to any disclaimer, the term of this patent is extended or adjusted under 35 U.S.C. 154(b) by 270 days.

(21) Appl. No.: 16/322,992

(22) PCT Filed: Aug. 4, 2017

(86) PCT No.: PCT/IB2017/054782
§ 371 (c)(1),
(2) Date: Feb. 4, 2019

(87) PCT Pub. No.: WO2018/025232
PCT Pub. Date: Feb. 8, 2018

(65) Prior Publication Data
US 2019/0184357 A1    Jun. 20, 2019

(30) Foreign Application Priority Data

Aug. 5, 2016 (IT) .................... 102016000083055
Aug. 5, 2016 (IT) .................... 102016000083078
Aug. 5, 2016 (IT) .................... 102016000083121

(51) Int. Cl.
*B01J 2/06* (2006.01)
*B01J 13/04* (2006.01)
(Continued)

(52) U.S. Cl.
CPC . *B01J 2/06* (2013.01); *B01J 2/08* (2013.01); *B01J 2/18* (2013.01); *B01J 13/04* (2013.01);
(Continued)

(58) Field of Classification Search
None
See application file for complete search history.

(56) References Cited

U.S. PATENT DOCUMENTS 3,886,086 A * 5/1975 Simpson .................... B01J 2/08
428/402
4,224,258 A    9/1980 Langen et al.
(Continued)

FOREIGN PATENT DOCUMENTS

EP    0197776    10/1986
EP    1686094    8/2006
(Continued)

OTHER PUBLICATIONS

Database WPI, Week 199347, Jan. 26, 1993, Thomson Scientific, London, GB; AN 1993-374354 XP002768595.
(Continued)

*Primary Examiner* — Mary Lynn F Theisen

(57) ABSTRACT

A maturation device for uncured polymeric dosage forms includes an external drum with an upstream inlet for entrance of a fluid with uncured dosage forms, and a downstream outlet for discharging cured dosage forms. The maturation device further includes a first body inside the drum defining at least one maturation chamber extending in the body between an upstream chamber inlet, in fluid communication with the inlet for uncured dosage forms, and a chamber downstream outlet. A first separation element is also included having a solid region, and a passing-through region, able, in an open condition of the chamber downstream outlet, to open the chamber outlet. At least the internal body is rotatable around an own axis to determine the closing/opening condition of a chamber downstream outlet of the internal body.

35 Claims, 6 Drawing Sheets

(51) Int. Cl.
  *B01J 13/14* (2006.01)
  *B01J 2/18* (2006.01)
  *B29B 9/10* (2006.01)
  *B01J 2/08* (2006.01)
  *B29B 9/16* (2006.01)
  *B01J 13/22* (2006.01)

(52) U.S. Cl.
  CPC ............... *B01J 13/14* (2013.01); *B01J 13/22* (2013.01); *B29B 9/10* (2013.01); *B29B 9/16* (2013.01)

(56) References Cited

U.S. PATENT DOCUMENTS

| | | | |
|---|---|---|---|
| 4,981,625 A | 1/1991 | Rhim et al. | |
| 6,347,930 B1 | 2/2002 | Muscat et al. | |
| 10,576,452 B2 * | 3/2020 | Lu | B01J 20/28016 |
| 2003/0230819 A1 | 12/2003 | Park et al. | |
| 2006/0199010 A1 | 9/2006 | DiCarlo et al. | |
| 2007/0082045 A1 * | 4/2007 | Yamanaka | B01J 13/04 424/451 |
| 2010/0237523 A1 * | 9/2010 | Bohmer | B01J 2/18 264/13 |
| 2011/0068497 A1 * | 3/2011 | Ahlin Grabnar | A61K 9/5192 264/9 |

FOREIGN PATENT DOCUMENTS

| | | |
|---|---|---|
| JP | 05279043 | 10/1993 |
| WO | 2009062254 | 5/2009 |

OTHER PUBLICATIONS

International Search Report 201600083121 dated Mar. 24, 2017.
International Search Report 201600083078 dated May 12, 2017.

\* cited by examiner

US 11,045,778 B2

DOSAGE FORMS MATURATION DEVICE, MACHINE AND PROCESS FOR PRODUCING DOSAGE FORMS WITH THE DEVICE

CROSS-REFERENCE TO RELATED APPLICATIONS

This application is a national stage entry of international application no. PCT/IB2017/054782, filed on Aug. 4, 2017, which claims priority to Italian application no. 102016000083055, filed Aug. 5, 2016; Italian application no. 102016000083078, filed on Aug. 5, 2016; and Italian application no. 102016000083121, filed on Aug. 5, 2016.

BACKGROUND OF THE INVENTION

The invention relates to a maturation device for curing uncured dosage forms, a machine and a process for producing dosage forms that use said device.

This disclosure relates to the production of seamless dosage forms by processes wherein droplets of a first fluid containing structuring substances such as monomers, polymers or polyelectrolytes, are placed in a bath of a second fluid containing suitable reagent in order to determine polymerization and/or crosslinking of the structuring agent contained in the first fluid.

It is known that dosage forms obtained by said processes are able to encapsulate and deliver a high number of substances such as active substances, cells, microorganisms, flavours, foods, proteins, metals, seeds, oils and essences. An example of said process is the so-called ionotropic gelation/gelification or ionic reticulation technique. Such technique provides a gelation process that occurs when a polymeric fluid, that is a fluid (for example a polymeric solution) comprising a polyelectrolyte (for example alginate or chitosan) is put in contact with a cation fluid, that is a fluid containing divalent or trivalent cations (for example a cationic solution comprising $Ca^{2+}$ e/o $Ba^{2+}$ e/o $Sr^{2+}$ e/o $Fe^{2+}$ e/o $Zn^{2+}$ e/o $Al^{3+}$) able to cause the polyelectrolyte gelation.

Within the description of the present invention, the polymeric fluid and/or the cationic fluid (or, in processes other than ionotropic gelation, the equivalent fluids with structuring substance and polymerizing/crosslinking reagent) are intended to comprise at least one liquid phase, and could be in a simple form, preferably a solution, or in a complex form, such as a suspension, emulsion or colloid, according to the desired final dosage form features.

In the most common instances of application, the gelling polyelectrolyte (for example alginate) of the polymeric fluid comprises carboxylic groups which, upon contact with gelling fluid, chelate the cationic fluid cations leading to the formation of complex and rigid lattices, that determine the formation of a defined structure. Such lattices are able to encapsulate any substance present in the polymeric fluid and/or the cationic fluid, which for this purpose could be supplemented with further appropriate excipients (such as for example surfactants, salts, lipids, polymers, sugars).

Generally, the process is performed by dispensing one or more droplets of polymeric fluid to a bath of cationic fluid, although the two phases can also be inverted. The substance to be encapsulated/delivered could be contained in the dispensed droplets or in the bath, according to the formulation needs.

The formation of the external polymeric lattice is fast and the droplet that falls in the bath retains its shape upon contact with the same bath; however, the internal structure takes at least some minutes to cure, resulting in a complete consolidation. The result is a corresponding number of dosage forms consisting of macro, micro- or nano-capsules, depending on the droplet size.

The spherical shape of the resulting dosage forms is specifically dependent on the feeding and dripping rates of the dispensed fluid droplets towards the other fluid's bath: processes with very slow feeding dripping speed rates correspond to a good spherical shape, while by increasing the feeing and/or the drop rates, the dispensed droplets progressively tend to taper, at the expense of the spherical shape of the final obtained product.

It is also known that said dosage forms are produced with appropriate machines that carry out processes comprising a feeding and a dispensing step, wherein droplets of one of the two fluids are dispensed towards a bath of the other fluid, and a formation step in which said droplets are put in contact with the bath of the other fluid for the lattices formation.

U.S. Pat. No. 4,224,258 A and EP 1 686 094 A1 describe an apparatus for producing nuclear fuel spherical particles, comprising a dripping unit for dispensing droplets of a first fluid towards a bath of second fluid, a chamber for the pre-treatment of the dispensed droplet by gas dispensing devices for the superficial consolidation of the dispensed droplets, and a second fluid hardening bath for the consolidation and formation of nuclear fuel spherical particles.

After the formation, a "curing phase" is required in order to allow the forming polymeric structure to consolidate even in the inner part of the dosage form.

A particular issue associated with the curing phase is the accurate control of the maturation time of the individual dosage forms. The curing time does not particularly affect the strength of the dosage form, but influences the release or storage performance of the encapsulated substance by the dosage form within the environment for which it was produced.

There are known techniques for managing this curing phase using systems with conveyor belts (EP 0 391 803 A1), or auger systems (WO2012/0177727).

It is also known that said steps may also be distinctly performed on different machines that perform the feeding, dispensing, forming, and maturation phases respectively, for obtaining the final dosage form.

Conversely, the different production phases can be combined into a single machine. In both cases, the machines generally comprise a device for dispensing droplets of a first fluid, such as a polymeric solution or a solution containing another structuring substance, in a bath of a second fluid containing the polymerizing/crosslinking reagent, such as a cationic solution, or vice versa, and a device that allows for the removal of the dosage forms newly-formed in other areas, therefore allowing them to cure within the second fluid bath.

However, such known machines, while being functional, exhibit some drawbacks such as having a large footprint due to the necessary horizontal positioning of certain components, particularly of the maturation devices, and a reduced productivity due to the feeding and dispensing phase. It is known that said step is a limiting factor for the production rate because the droplets cannot be dispensed too quickly since, beside the occurrence of a tapering effect, if more droplets were to fall in the same bath area, the bath would lose the cations (or the polymer in the case of a reverse production) too quickly. By doing so, the following droplet that would fall into the same bath area would not have the ability to gelify or otherwise to gelify optimally. To overcome this drawback, it has been proposed to agitate the bath by stirring. However, the stirring speed must be carefully controlled for at least two reasons:

1) an excessive stirring rate of the bath results in the formation of excessive shear forces upon impact of the droplet with the bath. This results in the loss of the substantially spherical shape of the single droplet, and thus of the final dosage form;

2) an excessive stirring rate of the bath causes the contact of the individual droplets before they can reach a degree of polymerization that allows them not to aggregate with one another.

A reduced productivity is also due to the curing phase because said step requires a specific time (usually between 10 and 30 minutes) during which the curing/consolidating dosage form remains immersed in the correlative solution.

The discharge of newly-formed dosage forms by the currently available techniques using conveyor belts or auger cannot be carried out at the maximum potential speed of the dispensing and forming phase.

Conveyor belts and the coil system occupy a linear space, and consequently a high-speed rate of such systems is related to a correspondingly greater length in order to maintain an adequate maturation time. This also creates further problems in the implementation of a continuous production process with limitations on production capacity.

In a completely different technical field, WO 2012/006344 A2 describes a dual flow direction valve for use in well drilling, wherein an adapter is needed between the top-drive and the pumping system of the liquid and drilling sludge, which are extracted by two concentric pipes. The valve has an outer valve body and an internal valve body that define two concentric pipes between an input and an output, and a rotating opening/closing ball of the pipes.

SUMMARY OF THE INVENTION

Therefore, a technical problem arises related to the production of a curing device for a production machine of seamless dosage forms by the ionotropic gelation technique, or by a similar technique wherein droplets of a first fluid are immersed in a bath of a second fluid, which solves or at least alleviate one or more of the aforementioned problems of the prior art.

Within said problem, it is particularly desirable that the device allows the machine to operate at high hourly productivity levels, allowing a substantially continuous production process and/or an accurate curing time for each single dosage form.

It is also desirable for the machine to be able to operate maintaining a spherical shape of the individual dosage forms.

It is also preferable that during the curing phase the device allows for the addition of further components to the dosage forms and/or a rapid separation thereof from the liquid in which they are immersed through a continuous process and/or that said process is adaptable to dosage forms with different densities (for example floating or sinking).

It is further desirable for the device and the machine to have a reduced footprint, and to permit a simple and inexpensive production and installation.

These results are obtained according to the present invention by a maturation device for uncured dosage forms according to the herein described subject matter.

The invention also relates to a machine and a process for the production of seamless dosage forms according to the herein described subject matter.

Preferred embodiments are described in the dependent claims, hereby incorporated by reference in their entirety.

BRIEF DESCRIPTION OF THE SEVERAL VIEWS OF THE DRAWINGS

More details can be obtained from the following description of non-limiting examples of embodiments of the object of the present invention with reference to the attached drawings, in which it is shown.

DETAILED DESCRIPTION OF THE INVENTION

Definitions

For description purposes of the present invention, the following definitions will also be taken into consideration in addition to those exposed in the introductory part.

FIRST FLUID (A): fluid containing a structuring substance, preferably a polymeric fluid, or fluid containing a polymerizing/crosslinking reagent of said substance, preferably a cationic fluid, with at least one liquid phase, and which is dispensed and/or atomized in the form of droplets towards a bath of a second fluid.

SECOND FLUID (B): fluid containing a polymerizing/crosslinking reagent, preferably a cationic fluid, or fluid containing a structuring substance, preferably a polymeric fluid, with at least one liquid phase;

which is provided in the form of a bath able to receive the dispensed droplets of the first fluid.

The second fluid is a fluid containing a polymerizing/crosslinking reagent of the structuring substance of the first fluid if the latter is a fluid containing a structuring substance, and vice versa.

The first and/or second fluid may contain substances to be encapsulated/delivered and/or additional substances such as excipients, as previously described.

PRE-DOSAGE FORM: dosage form in the production phase, having a poorly consolidated structure (e.g. polymeric), only present on its outer surface; within the scope of the present invention, this condition occurs from the moment when the dispensed droplet comes into contact with an aerosol containing the second fluid, until the droplet is submerged in a second fluid bath.

UNCURED DOSAGE FORM: dosage form in the production phase, having a substantially consolidated structure (e.g. polymeric) on the outer surface, and undergoing consolidation towards the inside of the dosage form; within the present invention, this condition occurs from the moment when a pre-dosage form comes into contact with a second fluid bath.

CURED DOSAGE FORM: dosage form that has reached the desired superficial and internal consolidation following an appropriate maturation; within the present invention, the term identifies a finished dosage form.

FEEDING AND DISPENSING PHASE: part of the seamless dosage forms production process comprising the actions of feeding and delivering a droplet of first fluid towards a second fluid bath.

PRE-DOSAGE FORM FORMATION PHASE: production process step of the seamless dosage forms that determines a superficial pre-consolidation of the dispensed droplet of the first fluid. It involves contacting a first fluid dispensed droplet with an aerosol containing the second fluid.

UNCURED DOSAGE FORMS FORMATION PHASE: step that determines a consolidation of the external portion and partly of the inner portion of the pre-dosage form. It comprises the immersion of a pre-dosage form in a bath of second fluid.

CURING/MATURATION PHASE: step that determines a desired consolidation of the structure of uncured dosage forms in a maturation device.

GELATION or GELIFICATION: chemical reaction that occurs when a pair of gelling polysaccharides binds to a cation.

AEROSOL: colloid in which droplets of a second fluid are dispersed in a gas (e.g. atmospheric air or nitrogen).

POLYMERIC SOLUTION: polymeric fluid in form of a homogeneous liquid blend wherein a gelling polysaccharide is molecularly dispersed in an appropriate solvent, such as an aqueous solvent.

CATIONIC SOLUTION: cationic fluid in the form of a homogeneous liquid blend wherein a cation is molecularly dispersed in a suitable solvent, such as an aqueous solvent.

As shown in FIG. 1 and assuming, merely for convenience and without any limiting sense, a pair of reference axes with directions respectively longitudinal, parallel to a longitudinal axis of axial development of a maturation device of the invention, and transverse X-X, of width of a maturation device and, in the example of FIG. 1, parallel to the axis of a horizontal plane, as well as a vertical direction Z-Z, parallel to the gravitational acceleration direction, in FIG. 1 it is schematically illustrated an exemplary machine for the formation of seamless polymeric dosage forms, comprising:

A feed and dispensing group 100 of a first fluid A, for example composed by a polymeric solution, in the form of droplets towards:

A group 200 for the formation of uncured dosage forms, comprising a containing chamber 208 of a second fluid bath B, such as a cationic solution, wherein the droplets of first fluid A undergo a consolidation process by gelation when in contact with said second fluid bath B, resulting in the creation of uncured dosage forms that require an appropriate maturation time for the consolidation of the internal structure; the bottom of the bath containing chamber 208 is shaped according to a conveying structure of the second fluid B containing uncured dosage forms towards a maturation device 300 of the present invention.

A maturation device 300 of uncured dosage forms according to the invention, comprising:

an external drum 310 with a preferably axial extension parallel to the longitudinal direction, in the example parallel to the vertical direction Z-Z of fall by gravity, extending between an upstream portion comprising an inlet 310*b* for a fluid B with uncured dosage forms, in fluid communication with the conveying structure of the forming group 200, and a downstream portion comprising an outlet 310*c* of the cured dosage forms, A first body 313 inside the drum 310, having a longitudinal axial extension and defining at least one maturation chamber 313*a* extending between a chamber upstream inlet 313*b*, which in an opening condition of the upstream input 313*b* is in fluid communication with the inlet 310*b* of the forming dosage forms, and a downstream outlet of the chamber 313*c*, proximal to the outlet 310*c* of the cured forms in relation to the inlet, for establishing a fluid passage towards downstream and towards the same outlet 310*c*, in an open condition of the chamber downstream outlet 313*c*; a condition that is preferably contextual to a closing condition of the maturation chamber inlet 313*b;*

A first separation element, in the example in the form of a disk 311, between the first internal body 313 and the dosage forms outlet of the drum 310, comprising a solid region 311*b* for closing a downstream outlet of the chamber of the first internal body in a maturation chamber closed condition, and an axially passing-through region 311*a*, able, in the chamber outlet open condition, to open the chamber outlet in order to allow passage of fluid from the maturation chamber towards downstream and towards the maturation device outlet;

According to an advantageous aspect of the invention, at least the internal body is rotatable around its own axis to determine the closing/opening condition of a maturation chamber outlet of the internal body. By rotating the internal body to set the chamber inlet 313*b* of the internal body 313 into at least partial alignment with the passing-through opening (region) 310*b*, it is possible allow a downstream flow of the second fluid B with curing/cured dosage forms within the curing device 300.

The curing time of the dosage forms within the maturation chamber will advantageously be adjustable by appropriately sizing the linear extension of the maturation chamber defined by the internal body, which may also not be rectilinear, and the rotation speed of the same internal body, and thus the opening/closing interval of the chamber outlet 313c. The shape and size of the chamber outlet 313c and the correlative aperture on the separation element can also be selected to achieve the desired maturation time.

It is therefore apparent how the rotating internal body, that defines at least one maturation chamber, allows the maturation time to be adjusted and the implementation of a substantially continuous process of formation and curing of the dosage forms in a simple and adaptable manner.

Figure 1:
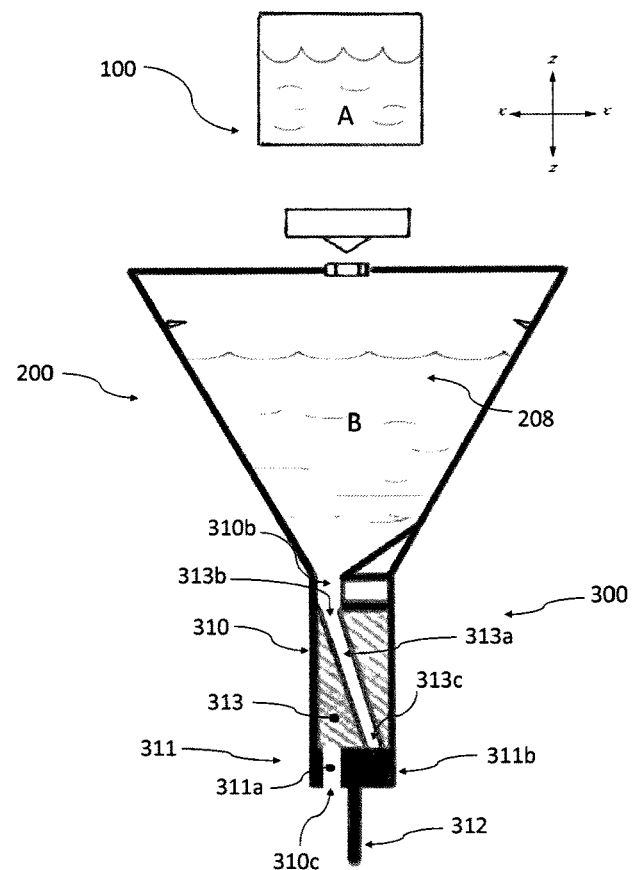
In FIG. 1: a schematic view of an axial, vertical section of a machine for producing dosage forms comprising a maturation device according to the present invention.
Figure 2:
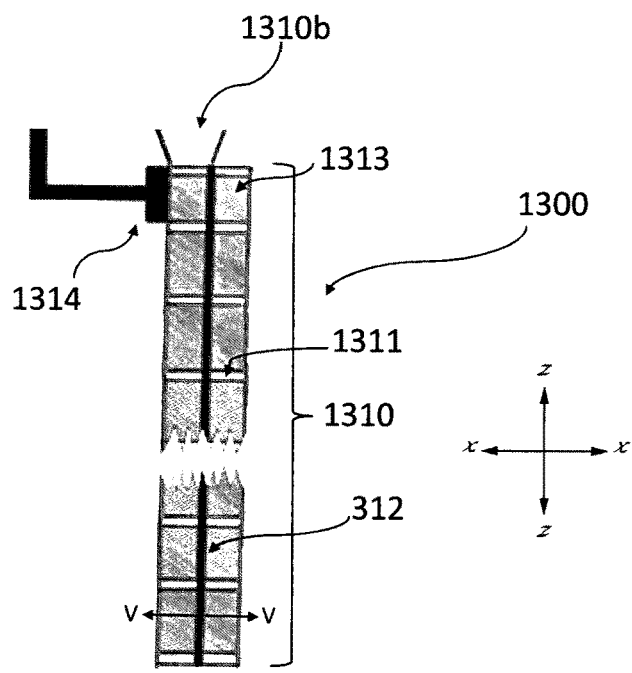
In FIG. 2: a schematic view of an axial, vertical section of a second configuration of the dosage forms maturation device of according to the present invention.

Referring to FIG. 2, a variant configuration of the maturation device 1300 provides a plurality of internal bodies 1313 separated by corresponding separation disks 1311 along the axial development from upstream to downstream of the maturation device 1300; subsequent bodies and disks will have to be configured in order to determine the fluid passage from a maturation chamber of a body to a maturation chamber of a subsequent body in the outlet chamber open condition.

For this purpose, the serially arranged separation disks and/or internal bodies are rotated in phase with each other, or in any case according to a rule that determines the desired curing time in the different maturation chambers and the subsequent passage of fluid with dosage forms from a maturation chamber to the subsequent one or to the outlet.

Preferably, this is achieved by means of a transmission shaft 312 which passes through a circular opening of the separation disks 1311 and internal bodies 1313, and is integral with the one and/or the others which are intended to be rotated.

The shaft 312 can be rotated by any mechanism that is able to set its rotation speed with precision, such as an electric gear motor. This transmission shaft may be hollow and preferably have on its surface one or more circular openings of variable diameter whose function will be clarified later.

According to a further preferred embodiment, one or more internal bodies of the maturation device may be rotated by means of magnetic or electromagnetic actuation devices. For example, the rotating body can be configured to have an internal magnetic portion, and the body rotation can be controlled by magnetic transmission means located for example outside the drum, or inside one or more of the separation elements.

Figure 3:
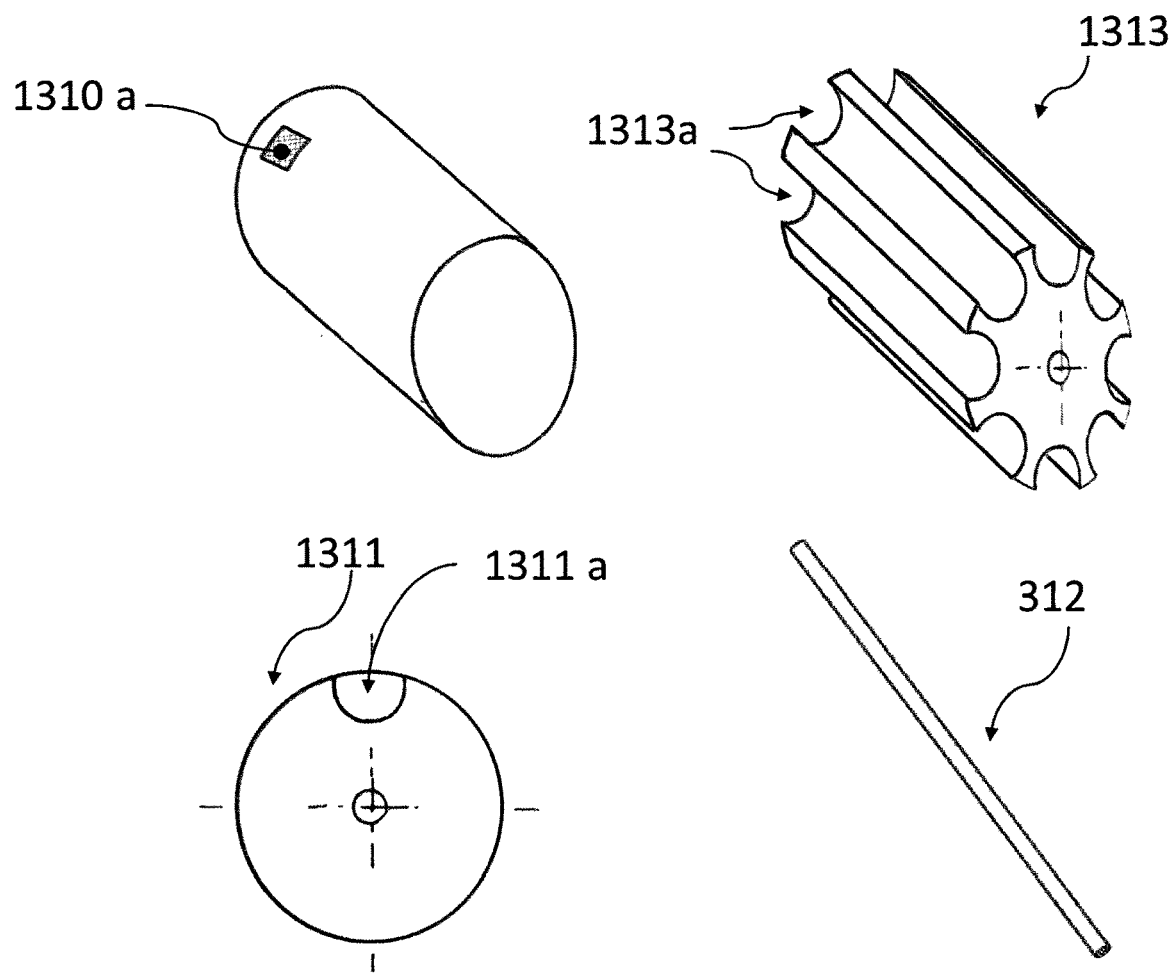
In FIG. 3: a partial perspective exploded view of a further embodiment example of dosage forms maturation device of the invention.

The maturation device may be arranged with the drum 1310 vertically oriented, or at an angle greater than 5° relative to a horizontal plane, orthogonal to the gravitational acceleration direction. The drum can have, for example, cylindrical, conical or conical frustum shape, and preferably have on its surface one or more variable-width openings or meshes 1310a with defined cut-off (FIG. 3).

The drum and/or one or more internal bodies may have an ellipsoidal, oblate spheroidal, prolate spheroidal shape and/or an ellipsoidal frustum, oblate spheroidal frustum, prolate spheroidal frustum section part.

Figure 5:
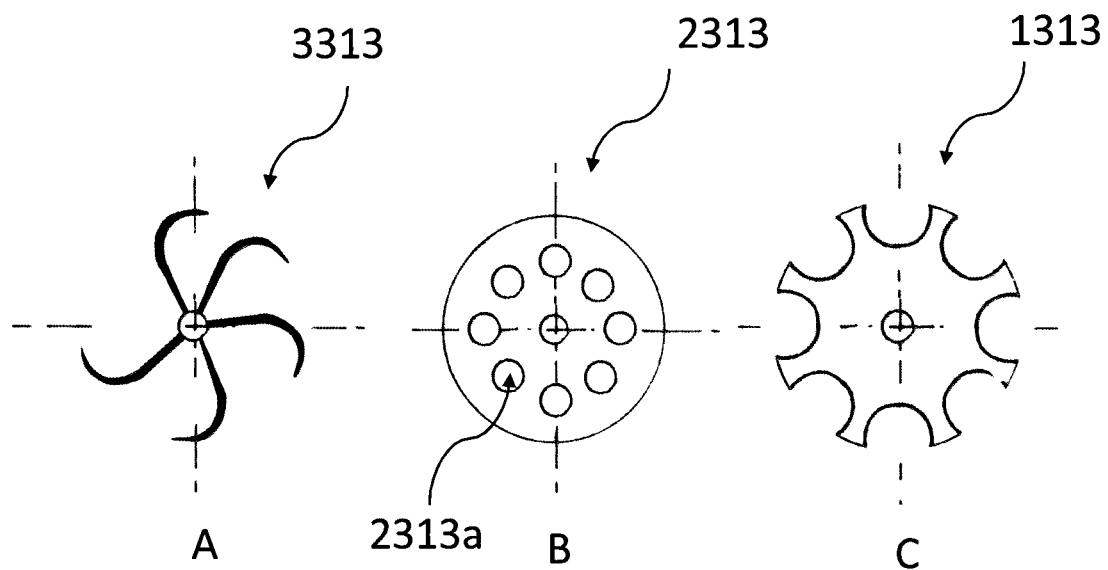
In FIGS. 5a, 5b and 5c: a radial sectional view of some possible configurations of an inner body of a curing device according to the invention, In FIG. 6a: a radial sectional view of a variant embodiment of an internal body and a relative separation disk of a maturation device according to the invention.

One or more sets of separating disks 1311 may be integral and perpendicular to the inner walls of the drum 1310. Such disks are, for example, circular with at least an axial passing-through region, for example corresponding to a circular part with an angle in the centre between 5 and 45 degrees, or for example of polygonal, circular or semi-circular shape (FIG. 5).

In general, a device of the invention with rotating internal body can be configured so that, when the downstream outlet of a maturation chamber of the body is in the open condition to allow the downstream flow of the fluid containing dosage forms, the upstream inlet of the same chamber is not in fluid communication with the inlet of the drum, and/or when the upstream input of a maturation chamber is in fluid communication with the inlet of the dosage forms in the maturation device, the downstream outlet of the chamber is in the closed condition, so as to allow an optimal filling of the maturation chamber. Such configuration can be obtained by a suitable orientation of the maturation chamber, by a suitable size of the drum inlet in relation to the maturation chamber inlet, by a suitably shaped separation element between the drum inlet and the first internal body, or by a combination of these elements.

This configuration can also be extended to the fluid communication between maturation chambers of subsequent internal bodies separated by separation elements, previously and subsequently described as an example in relation to preferred embodiments.

Referring now to FIG. 3, a preferred embodiment of the device 1300 comprises a cylindrical external drum 1310, a first internal body 1313 rotating coaxially to the drum and having a substantially cylindrical shape with axial longitudinal grooves 1313a on its outer surface, for defining corresponding maturation chambers 1313a closed against the drum internal surface, when the body 1313 is inserted into the external drum.

All embodiments of the internal body that exhibit a plurality of maturation chambers are preferred because they allow an increased production capacity proportional to the number of maturation chambers.

A separation disk 1311 has a shape corresponding to the drum section, with an empty region 1311a shaped according to an aperture at least partially overlapping, and preferably corresponding to the cross-sectional shape of the grooves 1313a of the internal body 1313 (in the example, a circle arc) to determine the opening condition of the respective chamber when the relative rotation of the body with respect to the disk determines the alignment of the outlet of a maturation chamber with the open region of the same separation disk.

The transmission shaft 312 is inserted coaxially to the internal body 1313 and to the disk 1311, and is integral with one or the other to rotate the body or disk.

Figure 4:
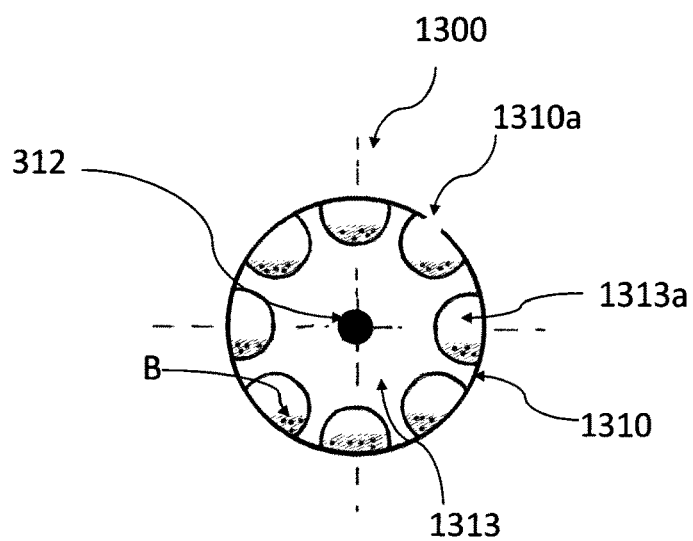
In FIG. 4: a sectional view of the assembled maturation device of FIG. 2, according to a radial plane passing through the V-V line of FIG. 2.

FIG. 4 shows a sectional view of the assembled maturation device of FIG. 2, 3, in which the plurality of chambers 1313a, developing in a rectilinear axial manner parallel to the longitudinal axis of the device, each comprise a respective fluid B containing the curing dosage forms. As already mentioned, once the device 1300 is assembled, the projection of one of said axial chambers on the separation disk can be inscribed in the form of the passing-through region 1311b of the disk 1311, and preferably corresponds thereto.

The chambers can be defined on the external peripheral surface of the internal body (FIGS. 3, 4, 5a, 5c), in which case the maturation chambers are closed by the internal surface of the drum through intimate contact with the internal surface of the drum 310, so that the body can rotate (if applicable) within the drum and the transferring of fluids and/or uncured dosage forms between the internal body and the inner surface of the drum is prevented. The chambers can also be defined internally to the inner body (FIG. 5b).

The body 1313 is able to rotate and is for this purpose integral with the drive shaft 312, which crosses it through the centre of the circumference of the two bases. Preferably, there are openings and/or ducts establishing a communication between the inside of the shaft and the maturation chambers of the inner body 1313.

The rotating body 1313 is axially adjacent to respective separation disks 1311. The arrangement of the disks and the rotating body is designed to ensure intimate contact between the two bases of the rotating body and a base of the disks adjacent thereto.

Figure 6:
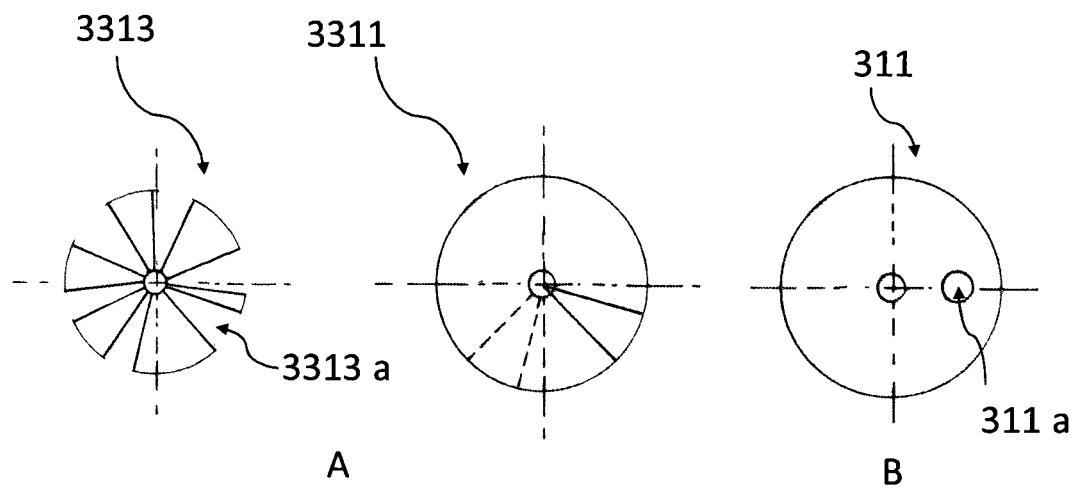
In FIG. 6b: a radial sectional view of a separation element adapted for use with the internal body of FIG. 5b.

Referring to FIGS. 5a and 6a, there may be variant embodiments of the internal bodies 3313 and their separation elements 3311 such as to define maturation chambers with an arch or circular section, or with baffle walls and separation disks with V-shaped aperture(s) (FIGS. 5a, 6a). Such embodiments are particularly effective for producing floating dosage forms since the baffles can extend outward from the drum inlet and above the level of Fluid B present in the conveying structure or in the containing chamber of the fluid B, to efficiently capture non-sinking dosage forms.

A particularly preferred form is shown in FIG. 5b, in which internal chambers of the body are defined by ducts 2313a passing axially within the body 1313, and the separation disk 311 comprises a corresponding circular opening 311a on its surface. Such embodiment is suitable for the insertion of spherical bodies of equal diameter as the duct, suitable for the cleaning of the duct from very viscous fluids or for the effective removal of all dosage forms.

It is not necessary that an internal body of the device is comprised of a single piece. According to a variant embodiment, the internal body may be formed by a plurality of parts that can be assembled, preferably consisting of axially extending segments suitable to be coupled along respective contact surfaces for the formation of the internal body. This can allow for an easier assembly and/or construction of the device.

According to a further preferred variant, between the parts contact surfaces forming the internal body, it is possible to insert elastic elements capable of generating a force that drives the parts of the rotating body against the internal walls of the drum, ensuring a greater fluid tightness between body and drum.

Figure 7:
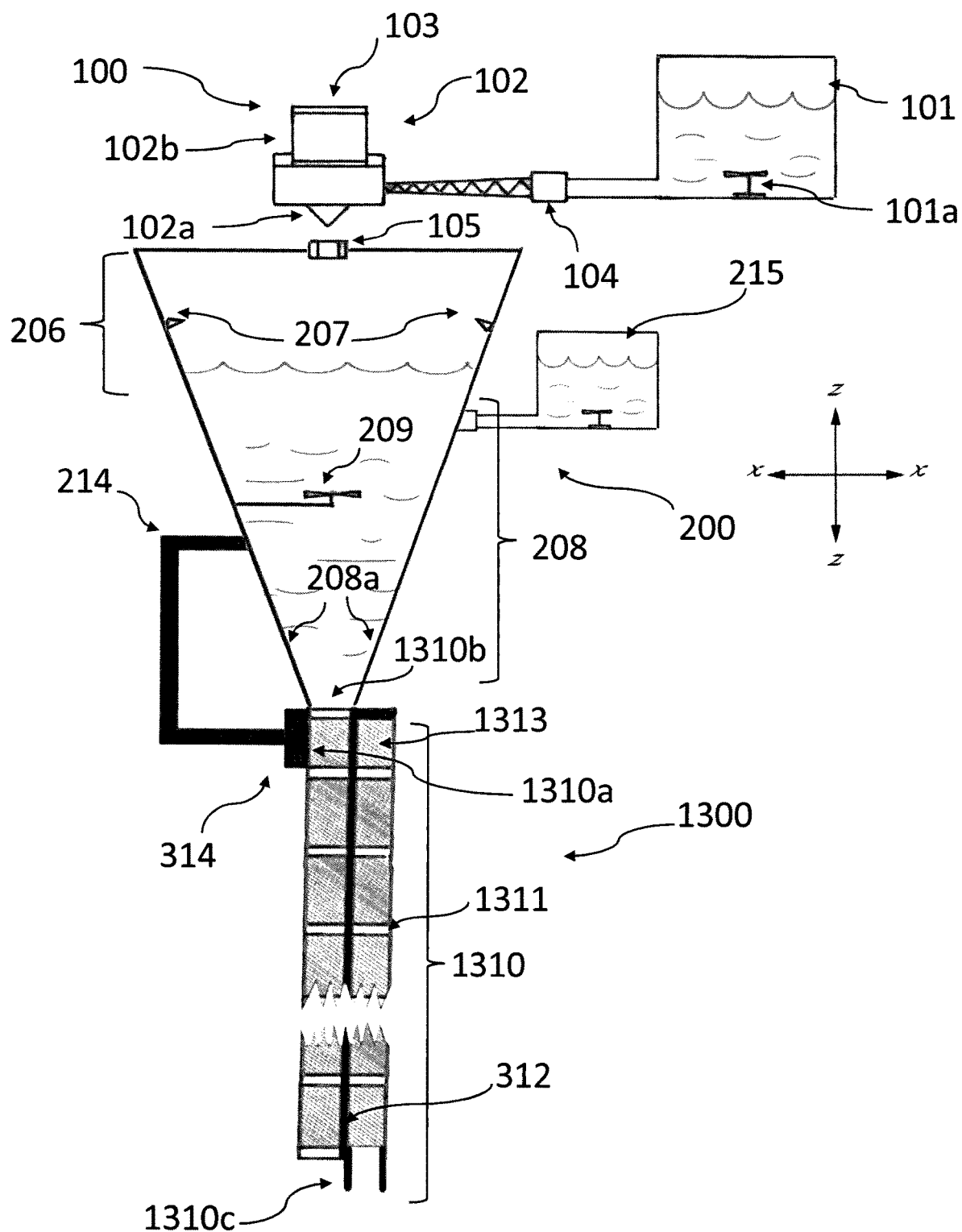
In FIG. 7: a schematic, axial, vertical section view of a second embodiment of a machine for producing dosage forms comprising a maturation device according to the present invention.

With reference to FIG. 7, a preferred machine for the production of cured dosage forms comprising a maturation device of the invention may comprise:

A feeding and dispensing group 100 of a first fluid A, in the example composed of a polymeric solution; the group 100 comprising:
A feeding reservoir 101 containing the first fluid A, optionally provided with a suitable stirrer 101a of the first fluid A;
A feeding pump 104 of the first fluid A from the reservoir 101 to a dispenser 102 of droplets, to which it is connected through a suitable pipe (e.g. a silicone or steel pipe). The feed pump is preferably of the Archimedean screw type;
said droplet dispenser 102 preferably comprising:
 a dripping chamber 102b connected to the feed pump and to one or more nozzles 102a located downstream of the chamber 102b. Said nozzles preferably have a single opening or multiple concentric openings. The chamber is preferably provided with an internal thermostat system and/or with a system 103 which generates a vibratory motion arranged thereover;
 an electrostatic dripper 105 located vertically below the one or more nozzles 102a. Such dripper 105 preferably consists of a metal ring connected to an electric current generator with variable voltage;
A group 200 for the formation of uncured dosage forms, comprising:
optionally, a pre-treatment/pre-consolidation chamber 206 located downstream, preferably below the vertical direction of the nozzle 102a, and preferably constituted by an upper part of a cylinder or a conical frustum.

The pre-treatment chamber 206 is associated with a group 207 for providing an aerosol of a fluid within the pre-treatment chamber (206) suitable to determine at least a superficial pre-consolidation of the falling droplet of the first fluid A, i.e. a first polymerization/crosslinking reaction at least on the outer surface of the falling drop within the pre-treatment chamber 206.

Preferably, and in the described exemplary embodiment, said fluid dispensed in the form of an aerosol is the same second fluid B provided in the forming chamber bath. It may possibly be advantageous to dispense aerosol of a similar fluid formulated with a different appropriate reagent concentration and/or viscosity to facilitate aerosol generation, and the choice of a suitable formulation will be within the reach of the technician.

In the illustrated example, the pre-treatment chamber 206 comprises suitable mechanisms 207 for producing an aerosol of a second fluid B, in the example a cationic solution.

The aerosol production group 207 may comprise at least one atomization system able to dispense the second fluid B in the form of finely divided droplets within chamber 206.

Figure 10:
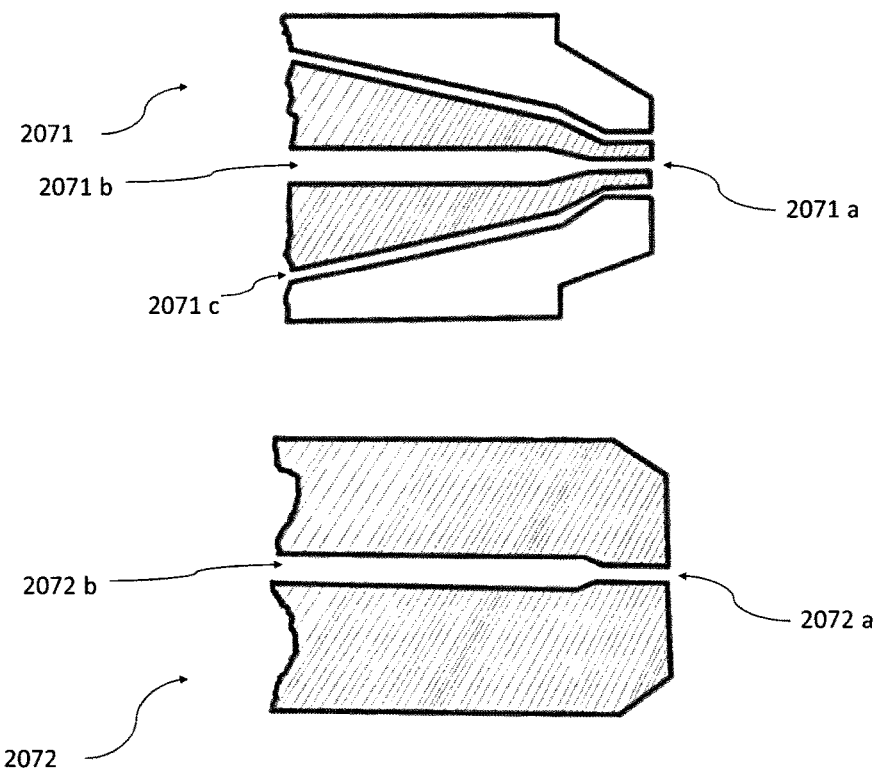
In FIG. 10: is a schematic, axial, vertical view of some possible atomizer nozzle configurations for producing an aerosol for a machine according to the present invention; and In FIG. 11: is a schematic, axial, vertical view of some possible configurations of a pre-treatment chamber with an aerosol production unit of a machine for producing dosage forms according to the present invention.

With reference to FIG. 10, a first example of the application of said spraying system comprises a two-way nebulizer 2071 with a feeding opening 2071b to which the fluid B is fed by means of a suitable pumping device (such as a peristaltic pump, an Archimedean screw, etc.) from the containing chamber 208 or from a separate container. The feeding opening 2071b is in fluid communication with a duct that is open to an aerosol feeding nozzle 2071a.

The nebulizer 2071 further comprises a duct 2071c whose outlet is located at the atomizer aerosol feeding nozzle 2071a and which is suitable to be fed with a gas (e.g. air or nitrogen). Said gas, emitted by the outlet at the feeding nozzle 2071a, breaks the flow of fluid B at the end of the nozzle 2071a, generating a finely divided spray cone and then a second fluid B aerosol.

With ongoing reference to FIG. 10, a second embodiment of a spray system of the aerosol production unit 207 of the invention comprises a high pressure (airless) atomizer 2072, wherein the second liquid fluid B is subdivided into droplets due to the pressure difference that is generated when the liquid is forcibly pumped from a duct 2072b through a feeding nozzle 2072a comprised of an outlet with a considerably reduced section with respect to the duct section 2072b. Such nebulization system is particularly effective for the atomization of viscous polymeric fluids; without being limited to the particular technical interpretation, it is assumed that this is due to the high pumping pressure that characterizes this type of fluids.

A containing chamber 208 of a second fluid bath B, arranged next to the pre-treatment chamber 206 and preferably constituted by a lower part of the cylinder or conical frustum of the pre-treatment chamber 206; the bottom of the bath containing chamber 208 comprises a funnel 208a, or a similar conveying structure of the second fluid B containing uncured dosage forms towards a maturation device thereof. The two chambers are connected with a respective suitable second fluid B loading system 215.
According to a preferred embodiment, a coil stirring system 209 is located at the centre of the forming/bath containing chamber, for example supported and actuated by an arm extending from the lateral surface of the chamber;
 a maturation device 1300 of the uncured dosage forms according to any of the above-described embodiments;
 A second fluid B recovery system 314 comprising a plurality of pipes connecting the aperture 1310a of the drum 1310 with a liquid pump, this pump being connected through another pipe to the containing chamber 208 of the forming bath.

The feeding pump of the dispensing unit is preferably of the Archimedean screw type, which allows optimum feed flow management, and, unlike other systems, allows dispersed systems to be discharged without damaging the dispersed substances in the first fluid A (e.g. cells, easily breakable).

With this configuration, and assuming the dripping of a first polymeric fluid A into a second cationic fluid B bath with a single nozzle, the machine operates as follows:

the feeding reservoir 101 is loaded with first fluid A stirred by a suitable device 101*a;* the feeding pump 104 connected to the feed reservoir and the dripping chamber draws the first fluid A from the feed reservoir and feeds it to the dripping chamber;

the first fluid A reaches the dripping chamber 102 from which it flows through a downstream nozzle 102*a*. The chamber is preferably equipped with an internal thermostat system so that the temperature of the first fluid A can be raised if the latter is too viscous, so as to reduce its viscosity and favour its dripping. It is also preferably provided with a system 103 which imparts a vibratory motion of the nozzle 102*a* at a given frequency. Such frequency disturbs the laminar flow of the first outflowing fluid A turning it into droplets, in accordance with Weber's law;

The droplets outflowing from the nozzle, passing through the electrostatic dripping, receive a positive electric charge that is placed on their surface. This charge generates two effects: it more efficiently breaks the laminar flow by speeding up the droplets towards the second fluid B bath, which presents an opposite charge, and it separates the different droplets since they present the same charge. This results in smaller and optimally separated droplets, which fall down at increased speed at different points of the second fluid B bath;

The droplets produced by the feeding/dispensing unit, due to gravity, cross the pre-treatment chamber 206 and come into contact with the aerosol of the second fluid B during the pre-treatment phase. Contact with this second fluid B aerosol allows a first gelation reaction to occur on the outer surface of each droplet, providing it with a partial surface strength and resulting in a so-called "pre-dosage form";

The obtained seamless polymeric pre-dosage forms fall into the second fluid B bath contained in the chamber 208 of the cylindrical vessel of the forming group.

The pre-dosage form obtained in the pre-treatment chamber allows the droplets not to deform upon impact with the bath of the second fluid B; moreover, since they have a superficial shell of crosslinked polymer obtained by pre-treatment, they do not adhere to one another;

The pre-dosage forms immersed in the second fluid bath within the forming chamber 208 consolidate their surface structure and begin to cure internally, reaching the state of uncured dosage form;

The stirring system 209 creates a stream of second fluid B containing uncured dosage forms towards the funnel 208*a*, which constitutes the conveying structure towards the inlet 1310*b* of the drum 1310 of the maturation device, also carrying the dosage forms immersed in the bath, which in any case would tend to fall by gravity.

Downstream of the inlet 1310*b*, the first inner body 1313 defines different separated maturation chambers inside the drum (for example, with eight chambers per rotating body). The first and subsequent rotating bodies rotate preferably in phase one with each other, so that the chambers of each rotating body are always in phase with those of the other rotating bodies.

The axially pass-through apertures located on the separation disks are preferably angularly offset with respect to each other. The transmission shaft or alternative drive means rotate the rotating bodies around their longitudinal axis (and possibly one or more designated separation elements), and the rotation of the rotating body more adjacent to the inlet 1310*b* involves the opening of the communication between the conveying structure and one of the maturation chambers of the first rotating body. Said chamber is then filled with the second fluid B (for example, a cationic solution) and with dispersed uncured dosage forms, which flow from the chamber 208 to a maturation chamber of the first body 1313.

At the inlet 1310*b*, which connects the uncured dosage forms forming chamber 208 with one of the maturation chamber of the first internal body, the drum preferably has an aperture or grid 1310*a* on its surface, or a set of calibrated apertures connected to the recirculation system 214. With this preferred configuration, a communication is established between the maturation chamber, the recirculation system 214 and the forming chamber 208. A flow of second fluid B, which loads the chamber with dosage forms faster than by simple fall by gravity, is thereby generated and feeds the maturation chamber through the funnel 208*a*.

Next, the rotating body continues to rotate and closes the communication of the maturation chamber with the inlet 1310*b*, and then with the forming chamber 208 and the recirculation system 214, 314, if present. The uncured dosage forms and the second fluid B that contains them are enclosed within the maturation chamber of the rotating body 1313, in which they mature during the rotation of the same for an appropriate amount of time defined by the linear extension of the chamber and by the rotation time between an opening condition of the maturation chamber outlet and the following one.

Next, the chamber comes into alignment with the opening of the adjacent downstream separation disk, allowing the material to be transferred to a subsequent maturation chamber of the next rotating internal body, also aligned with the opening of the (upstream) separation disk; Preferably, the position of the sequentially located openings is such that the transfer only takes place after a complete rotation of the respective rotating body 313 (or disk) upstream of each opening, thus exploiting the entire rotation time of the body or disk for the maturating, and obtaining a compact maturation system (for example, eight maturation chambers are possible for a single internal body).

This structure of the maturation device 1300 prevents contact of the material present in a chamber with the material located in an adjacent chamber, ensuring a controlled maturation time for each set of dosage forms.

The structure is modular and hence there may be an appropriate number of internal bodies with chambers and respective separation disks placed in series from upstream to downstream within the external drum. Different sections of the drum can be suitably shaped and contain internal bodies and separation elements of different shape.

The second fluid B bath, which contains the dosage forms, moves from one chamber to another following the inclination of the drum under the effect of gravity, or by the injection of gases or liquids that can wash the entire inner surface of an emptying maturation chamber through the possible openings (FIG. 4).

Depending on the shape of the internal body and the respective maturation chambers, the openings or grids 1310a with a defined diameter on the surface of the drum 1310 and/or the openings on the transmission hollow shaft 1310 allow for additional compounds to be added to the curing dosage forms inside the maturation chambers. For example, solutions of other polymers may be added to perform a coating, air or nitrogen can be blown to keep the maturation dosage forms in a stirred condition, and increasing the pressure in the maturation chamber by speeding up the transfer to the following one. Such openings can also be used to remove the second fluid B from the maturation chamber to allow its drying or the addition of other fluids.

According to a further aspect, one or more separation elements can be configured with a solid region having a series of holes in fluid communication with the outside of the drum. In such holes, it is possible to blow a gas to keep the polymeric curing forms in a stirred condition inside a closed chamber from the solid region of the separation element, or to add one or more liquids during maturation. A rotating internal body can also have openings that connect a shaft cavity with the maturation chambers for air insufflation or fluid circulation.

At the end of the path within the drum 310, the dosage forms will have completed their maturation period and can be harvested and treated as needed.

Figure 8:
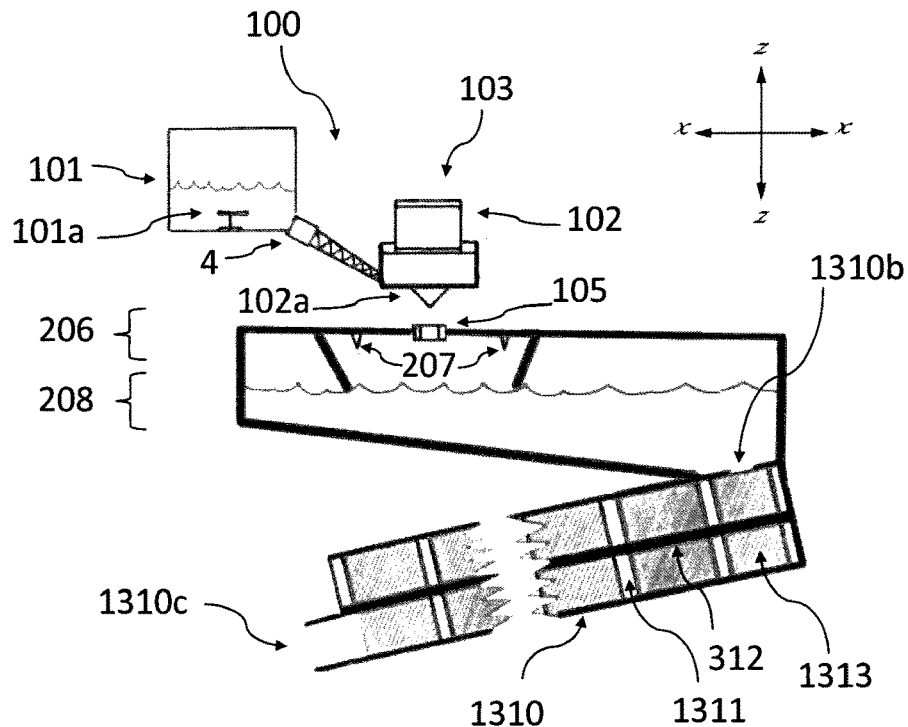
In FIG. 8 is a schematic, axial, vertical view of a third embodiment of a machine for producing dosage forms comprising a maturation device according to the present invention.

In a variant embodiment shown in FIG. 8, the drum 1310 is connected to the conveying structure of a forming chamber 208 through a lateral input 1310b. The first rotating internal body is partially exposed within the forming chamber 208, at the conveyor structure thereof. In the case of sinking dosage forms, these are transferred by gravity to the maturation chambers of the first body 1313, flowing to the bottom of the conveying structure of the forming chamber 208, and are subsequently transferred to the subsequent rotating internal bodies. In this configuration, the upper separation disk may also not be present or may not have openings. It is possible to apply the recirculation system 214 by generating a continuous flow of second fluid B that loads the maturation chambers in communication with the formation chamber with uncured dosage forms faster than by simple gravity fall.

In the case of the production of floating systems, it is particularly useful to use rotating bodies with baffles and divisors with V-shaped openings, as shown in FIGS. 6a and 5a, positioning and sizing the first rotating body so as not to be fully immersed in the fluid B within the conveying chamber.

According to further preferred embodiments, the external drum can be conical or conical frustum or have one or more conical or conical frustum sections. One or more internal bodies may also be conical or conical frustum, or be formed with one or more conical or conical frustum sections.

Figure 9:
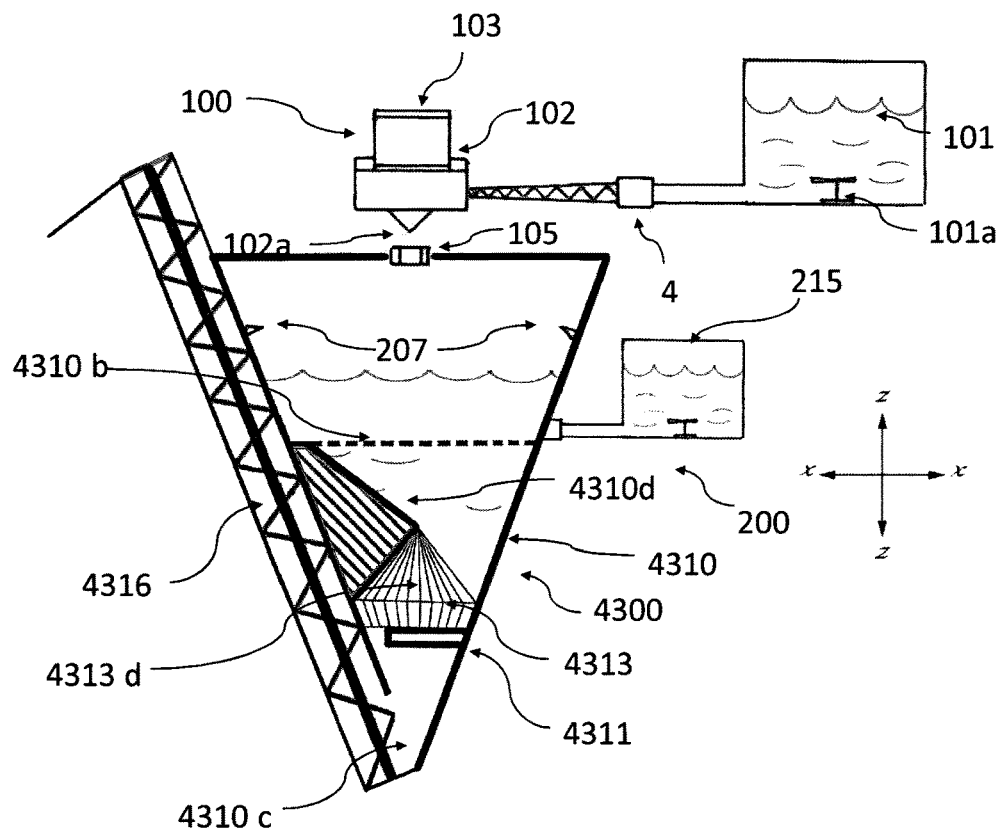
In FIG. 9: a schematic, axial, vertical view of a fourth embodiment of a machine for producing dosage forms comprising a maturation device according to the present invention.

In a variant embodiment shown in FIG. 9, the drum has a substantially conical or conical frustum shape with a larger base facing the conveying structure of the uncured dosage forms production machine to which it is coupled. This larger base has an inlet 4310b of uncured dosage forms and fluid B into the maturation device 4300. Inside the drum there is a first rotating body 4313 having a first section part 4313d whose conical or conical frustum shape is inverted with respect to the shape of the drum 4313, the latter having a bulkhead 4310d on part of its inner surface to define a contact wall with the conical or conical frustum outer lateral surface of the upper section part of the first internal body 4310. This body is rotatable and has a conical or conical frustum bottom part whose bottom side is in contact with a separation element (4311). In this case, the internal body 4313 has longitudinal grooves on its outer surface, suitable for defining corresponding maturation chambers which are closed laterally by the inner surface of the drum (at the top by said bulkhead 4310d) and at the bottom by said divider element 4311. The divider 4311 is provided with an opening 4311a capable of establishing the fluid connection from a maturation chamber of the first body 4313 to a drum outlet 4310c.

Between the first separation element 4311 and the outlet there may be further internal bodies, for example with a conical frustum shape and having the same orientation of the drum, and respective separation elements.

Preferably, the outlet 4310c is connected with an extraction device, constituted in the example by an Archimedean screwfeeder 4316 with an axial extension preferably forming an angle between 5 and 700 with respect to the longitudinal direction parallel to the axis of the drum. In the case of sinking dosage forms, these are transferred by gravity to the maturation chambers. The rotation of the last internal body determines the opening of the chamber outlet of one of the internal body chambers towards the outlet 4310c, and the subsequent transfer of Fluid B comprising the uncured dosage forms to the coil 4316, which allows its transfer to another site where dosage forms can be retrieved and/or treated as needed. The size and positioning of the rotating internal body allow a proper maturation of the dosage forms and a controlled filling of the coil that would otherwise be filled with fluid B to the same level of the maturation chamber due to the principle of communicating vessels.

It is eventually possible to apply the recirculation system 214 by generating a continuous stream of second fluid B which charges the exposed maturation chambers with dosage forms faster than by simple gravity fall.

A possible variant embodiment of the feeding group of first fluid A in form of droplets provides that the fluid is fed to a spray dispensing system capable of delivering the first Fluid A in the form of finely divided droplets. In this case, two-way atomizers 2071 or previously described atomizers 2072 with reference to FIG. 10 may be adopted. Such an embodiment may be particularly advantageous if it is intended to produce small diameter dosage forms with high hourly production.

Figure 11:
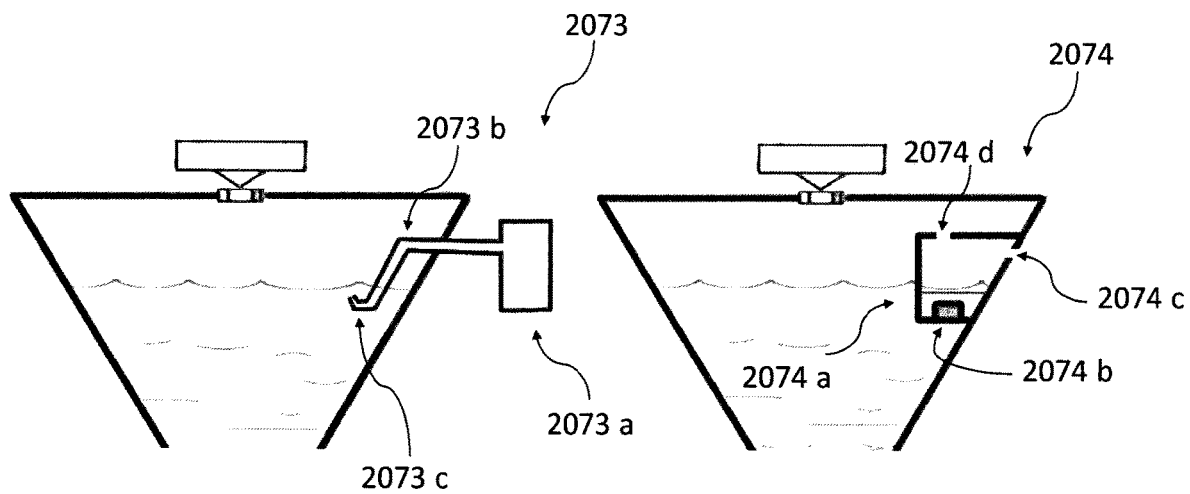

With reference to FIG. 11, a possible variant embodiment of an aerosol generator 2073 of a second fluid B in the pre-treatment chamber 206 comprises a bubbling system 2073 in which a pneumatic pump 2073a introduces through a pipe 2073b a gas (for example air or nitrogen) within the fluid B contained in the forming chamber 208. The immission of said gas is occurs from the end 2073c of the pipe 2073b, which is placed (immersed) under the fluid B level. The bubbles of gas pass through Fluid B undergoing humidification, and emerge in the pre-treatment chamber 206 creating in the same chamber a steam-saturated environment of the second fluid B (with humidity close to, equal to, or greater than 100%) forming a mist (aerosol) of said second fluid B. The contact with such second fluid B mist/aerosol allows a first gelation reaction on the outer surface of each droplet dispensed by the dispensing unit 102, providing it with a partial surface strength and obtaining the so-called "pre-dosage form".

It is possible to associate to said variant embodiment of group 2073 with a vent opening in pre-treatment chamber 206, so as to allow an optimum compensation of the pressure created in this pre-treatment chamber 206. It is possible to associate this vent opening with any pneumatic pump such as to blow and/or draw gas so as to generate negative or positive pressure in the pre-treatment chamber.

The reduction of the partial pressure of the gas/liquid interface favours the evaporation of fluid B, resulting in increased presence of fluid molecules B in the pre-treatment chamber. The use of negative pressure may be particularly advantageous in combination with the use of an aerosol-dispensed fluid in which volatile substances (e.g. ammonia or glutaraldehyde, in the case of chitosan as a gelling agent) are dissolved, to improve/accelerate the consolidation effect of the surface of each droplet dispensed by the dispensing unit 102. With ongoing reference to FIG. 11, a further embodiment of a group for dispensing the second fluid B in the form of aerosol comprises an ultrasonic system 2074 comprising a sonication chamber 2074a connected, through a first duct to the second fluid B bath containing chamber 208, wherein said fluid B enters said ultrasonic system where a mechanism capable of imparting a vibratory motion, such as for example a piezoelectric crystal 2074b, imparts mechanical stresses to the fluid B through a membrane, breaking it into droplets.

A transport/dilution gas is introduced from a second duct 2074c, said gas being capable of spreading the droplets formed within the pre-treatment chamber 206 through a discharge duct 2074d which flows into the pre-treatment chamber 206.

The first duct is preferably connected to the containing chamber 208, but may also be connected to a different container from which the second fluid B to be fragmented into droplets is fed.

Any embodiment of a production unit of an aerosol of a suitable fluid in the pre-treatment chamber may be associated with the vent opening, possibly connected to any pneumatic pump so as to blow and/or draw gases to generate a negative or positive pressure in the pre-treatment chamber.

A skilled technician will be able to integrate in the same machine two or more of the different embodiments of the aerosol production group in the pre-treatment chamber described above, to provide a particularly heterogeneous aerosol or to provide a machine structure suitable for fluids of different nature. A skilled technician will also be able to provide means for switching the operation of the machine to exclude one or more of said different elements of the aerosol production group.

It is also apparent that, although the invention has been described with reference to an aerosolized fluid in the pre-treatment chamber corresponding to the second fluid B provided in the form of a bath in the formation chamber, or comprising the same crosslinking/polymerizing structuring substance, the invention is not limited in such a way, but it can also be implemented by providing, in the form of an aerosol, any suitable fluid capable of determining the desired superficial consolidation of the droplet passing through the pre-treatment chamber.

It is also within the reach of the technician to appropriately modulate the concentration of a structuring or reactant substance in the fluid to be dispensed in the form of an aerosol, and the viscosity of the latter, according to the desired degree and type of superficial consolidation to be obtained for the pre-dosage forms. Combining multiple processes into one machine is of particular relevance in the pharmaceutical and biological fields where, for example, there may be a need to operate in sterile conditions. The application of sterility protocols to a single machine is particularly advantageous. In addition, reducing the size of this machine results in the reduction of costs and the possibility to use it in biological or pharmaceutical research laboratories.

It is within the reach of the technician skilled in the art to determine the cycle and the execution times of the various phases, as well as the selection of the number of internal bodies and separation elements, the rotation rate of the same, as well as the opening/closing characteristics of the maturation chambers defined by the internal bodies and the features of the separation element openings.

Further configurations are possible wherein multiple drum groups are positioned in parallel, and are possibly connected to each other.

It is therefore apparent how the use of rotating internal bodies with multiple maturation chambers allows for the realization of a compact maturation device adaptable to the spaces available, with high production capacity even in continuous mode.

The use of a drum with side holes or grids allows the use of several production techniques in a single apparatus. For example, removal of the gelling bath and addition of further compounds or drying.

The different embodiments of internal bodies allow for an efficient production of dosage systems with different densities.

It is also apparent that a single maturation device can be provided in the form of a kit that can be assembled with a drum and various internal body configurations and separation disks, selectable from the kit according to the actual production needs and interchangeable according to changes in the dosage form format and/or the production process.

It is also apparent how the use of the screw pump in the first fluid A supply system allows the transfer of the dispersions whose dispersed phase is fragile or may be damaged by other transfer systems, while maintaining an optimum flow control.

The Archimedean screw type pump and the dispensing unit allow the delivery of fluids whose physical stability, intended as homogeneity and absence of sedimentation, is limited. This is the case, for example, of dispersed systems with high size (seeds) or high density (metals) that involve a quick separation of the phases.

The aerosol production system 207 provides a pre-form to the dosage forms. The pre-form stabilizes the dosage form with the consequent possibility of increasing the process speed, while synergistically ensuring more spherical form of the produced dosage forms and a reduced incidence of agglomeration of two or more dosage forms in formation. This is particularly effective when the aerosol 207 is used in combination with the electrostatic dripper 105 and a vibratory motion, so that well-rounded and separate droplets are obtained that maintain their spherical shape due to the pre-treatment with the aerosol.

The machine with supply/delivery and forming groups allows a greater hourly delivery of uncured dosage forms towards a maturation device.

The recirculating system 214 applied to any of the machine/device configurations allows a higher loading speed of the maturation chambers with a subsequent increased production speed.

It is also apparent how the maturation device of the invention in its multiple configurations, although described in relation to an application in which the first fluid is a polymeric fluid and the second fluid is a cationic fluid, is applicable to any production equipment of a chemical reaction product in the presence of a fluid, wherein it is necessary for said reaction to occur over a certain amount of time in order to execute a maturation process with the desired product characteristics (for example, radical polymerization or chitosan crosslinking with glutaraldehyde).

The subject matter of the description also includes a process for the formation of seamless polymeric dosage forms comprising the steps of feeding a first fluid (A) from a reservoir to a first fluid A droplet dispenser;

delivering at least one droplet of the first fluid A to a forming chamber containing a second fluid B bath, located downstream of the dispenser;

immersing the dispensed first fluid (A) droplet in said second fluid B bath for superficial and at least partially internal consolidation, obtaining at least one uncured seamless polymeric dosage form;

conveying towards a maturation device of the second fluid B with at least one uncured polymeric dosage form, maturating at least an uncured dosage form within the maturation device;

wherein the second fluid B with uncured dosage forms is fed to a maturation device comprising:

an external drum, with an upstream inlet for the intake of the fluid with uncured dosage forms, and a downstream outlet for the discharge of cured dosage forms;

a first body inside the drum, comprising:

at least one maturation chamber extended in the body between an upstream chamber input, in fluid communication with the forming dosage forms inlet, in an open configuration of the upstream input, and a chamber downstream outlet, for establishing a fluid-dynamic passage towards downstream and the discharge outlet, in an open condition of the downstream outlet chamber;

a first separation element, comprising a solid region for closing a downstream outlet of a chamber of the first internal body, and a passing-through region, able, in a chamber downstream outlet open condition, to open the chamber outlet to allow the passage of fluid towards downstream and the discharge outlet of the maturation device, wherein a communication is opened between the forming chamber and one of the maturation chambers of the first internal body, wherein said chamber is filled with the second fluid B containing at least one uncured dosage form dispersed therein, and wherein at least one of the internal body and the separation element is rotatable around an own axis to determine the opening of a downstream maturation chamber outlet of the internal body after an appropriate maturation time of at least one dosage form.

In such a process, said first fluid A and second fluid B can be selected between a fluid containing a structuring substance, preferably a polymeric fluid, and a fluid containing a polymerizing/crosslinking reagent of said structuring agent, preferably a cationic fluid, wherein the second fluid is a fluid containing a polymerizing/crosslinking reagent of the structuring substance of the first fluid if the latter is a fluid containing a structuring substance, and vice versa.

The process may preferably comprise the further steps of providing a pre-treatment chamber between said dispenser and said second fluid B bath containing chamber, the pre-treatment chamber being associated with a mechanism for the production of an aerosol of a fluid to determine at least a superficial consolidation of said droplets dispensed inside the pre-treatment chamber;

producing an aerosol of said fluid in said pre-treatment chamber at the passage of said at least one droplet dispensed to form an at least partially superficially consolidated pre-dosage form;

the first fluid droplet will then be immersed in the second fluid bath in the form of said pre-dosage form.

The preferred characteristics of the maturation device and of a dosage form production machine described with reference to FIGS. 1-11 can also be integrated or adapted for use in the further process described. Furthermore, within the maturation device, the dosage form can be coated with other substances and/or washed with aqueous or organic solvent and/or dried.

For example, the feed characteristics of the first fluid to be dispensed described with reference to the exemplary machines of FIGS. 7-11 may be applied to the described process. According to a further example, a vibratory motion is generated within the dripping chamber and/or the second fluid bath in the forming chamber is stirred by means of a stirring system.

Similarly to what has been described above, a second fluid B extracted from the maturation device can be recirculated to the forming chamber by means of a series of pipes connecting the maturation device to a liquid pump which is connected by another pipe to the containing chamber of the forming bath of the dosage forms.

The production of an aerosol in the pre-treatment chamber can be performed by means of one of the systems described above, such as a system for spraying or injecting a gas into the second fluid B bath contained in the forming chamber.

The first and/or second fluid may be selected from those previously listed in relation to the embodiments of the present invention.

This further described process can advantageously be implemented in continuous mode.

Although described in the context of some embodiments and some preferred examples of implementation of the invention, it is understood that the scope of protection of this patent is determined solely by the following claims.

The invention claimed is:

1. A maturation device for curing seamless dosage forms, comprising:

an external drum (310) with an upstream inlet (310b) for entrance of a fluid (B) containing uncured dosage forms, and a downstream outlet (310c) for discharging cured dosage forms;

a first internal body (313) inside the drum, defining:

at least one maturation chamber (313a) extending in the body between an upstream chamber inlet, in fluid communication with the inlet for uncured dosage forms in an open condition of the upstream chamber inlet, and a chamber downstream outlet, for establishing a fluid passage towards downstream and the discharge outlet, in an open condition of the chamber downstream outlet;

a first separation element, comprising:

a solid region for closing a downstream outlet of a chamber of the first internal body, and a passing-through region, able, in the chamber downstream outlet open condition, to open the chamber downstream outlet in order to allow passage of fluid towards downstream and the discharge outlet of the maturation device;

wherein at least the first internal body is rotatable around an own axis to determine the closing/opening condition of the downstream outlet of a maturation chamber of the first internal body.

2. The maturation device according to claim 1, further comprising one or more internal bodies (313) separated by corresponding one or more separation elements (311), sequentially arranged downstream of said first separation element (311) along the maturation device (300) upstream to downstream extension towards the cured dosage forms discharge outlet; wherein an upstream outlet of at least one chamber of each body and at least a passing-through region of a separation element upstream the body, and/or a downstream outlet of at least one chamber of each body and at least a passing-through region of a separation element downstream the body, are shaped to establish a passage for the fluid (B) containing uncured dosage forms from a maturation chamber of an upstream body to a maturation chamber of a successive downstream body or to the downstream discharge outlet of the maturation device, in a concurrent open condition of the upstream body chamber downstream outlet and of the successive downstream body chamber upstream inlet or of the maturation device discharge outlet, wherein at least one between each internal body and a neighbouring separation element is rotatable around an own axis to determine said concurrent opening condition of an upstream internal body maturation chamber downstream outlet and of a successive downstream internal body chamber upstream inlet or of the maturation device discharge outlet.

3. The maturation device according to claim 2, further comprising a rotational driving means for driving the one or more internal bodies and/or separation elements designated to rotate, comprising: a transmission shaft (312) passing through a round aperture of each separation element (311) and each internal body (313), and integral with the former and/or the/these latter that are designated to rotate; and a means for rotationally driving the shaft (312), in order to determine said rotation of one or more internal bodies and/or separation element/s designated to rotate, and/or magnetic or electromagnetic rotating drive means;
wherein optionally the separation elements and/or the internal bodies not designated to rotate, are integral with an internal surface of the drum.

4. The maturation device according to claim 1, wherein one or more maturation chamber/s are defined on the external peripheral surface of a respective internal body, and are closed by an internal surface of the drum (310) by means of an intimate contact therewith, such that the internal body can eventually rotate inside the drum, but that there is no transfer of liquids and/or uncured dosage forms between the internal body and the drum internal surface.

5. The maturation device according to claim 4, wherein one or more internal bodies have at least one axially extending longitudinal groove (1313a) on an external surface thereof, for defining a maturation chamber (1313a) closed against the drum internal surface, when the body (1313) is inserted in the external drum; the separating element (1311) adjacent to each of said body/ies with groove(s) have a passing-through region (1311b) formed as an aperture partially overlapping, and corresponding with the cross-section shape of the adjacent internal body (1313) groove/s (1313a), to determine the open condition of a respective maturation chamber defined by a groove,
wherein optionally said one or more groove is substantially shaped as a semicircle, arc of circle or whisker and/or said aperture/s of the separating element being shaped as a semicircle, arc of circle or V.

6. The device according to claim 1, wherein one or more maturation chamber/s are defined by a respective throughduct (2313a) passing through the internal body (2313).

7. The maturation device according to claim 1, further comprising a feeding/sampling circuit for feeding/drawing a fluid (B) from or to one or more maturation chamber of an internal body, the circuit comprising a communication section for connecting a maturation chamber with a chamber outside the drum.

8. The maturation device according to claim 4, wherein said communication section comprises:
a first duct inside an axial shaft (312) of the maturation device and connected with one or more maturation chamber/s by a further duct; or
one or more apertures outside the drum (310a) and connected with the maturation chamber(s).

9. The maturation device according to claim 1, wherein the drum and/or one or more internal body/ies are shaped as coaxial cylinder/s and/or have a part shaped as a cone or as a conical frustum; or in that the drum and/or one or more internal bodies are shaped as ellipsoid, oblate spheroid, prolate spheroid and/or have a part shaped as an ellipsoid, oblate spheroid, or prolate spheroid.

10. The maturation device according to claim 1, wherein one or more separation elements have holes passing through the solid section and in fluid communication with insufflation means of a fluid through the holes.

11. The maturation device according to claim 2, wherein the device is configured so that the internal bodies and the separation elements designated to rotate, sequentially arranged from upstream to downstream, are rotated in phase to each other.

12. The maturation device according to claim 1, wherein one or more internal bodies are composed by a plurality of axially extending longitudinal parts able to be coupled along respective contact surfaces to form the internal body;
wherein, optionally, elastic elements are inserted between the contact surfaces forming the internal body.

13. A machine for the production of seamless dosage forms, comprising a maturation device for curing uncured dosage forms, the maturation device comprising:
an external drum (310) with an upstream inlet (310b) for entrance of a fluid (B) containing uncured dosage forms, and a downstream outlet (310c) for discharging cured dosage forms;
a first internal body (313) inside the drum, defining:
at least one maturation chamber (313a) extending in the body between
an upstream chamber inlet, in fluid communication with the inlet for uncured dosage forms in an open condition of the upstream chamber inlet, and
a chamber downstream outlet, for establishing a fluid passage towards downstream and the discharge outlet, in an open condition of the chamber downstream outlet;
a first separation element, comprising:
a solid region for closing a downstream outlet of a chamber of the first internal body, and
a passing-through region, able, in the chamber downstream outlet open condition, to open the chamber downstream outlet in order to allow passage of fluid towards downstream and the discharge outlet of the maturation device;
wherein at least the first internal body is rotatable around an own axis to determine the closing/opening condition of the downstream outlet of a maturation chamber of the first internal body.

14. The machine according to claim 13, further comprising, upstream of the maturation device (300):
   A group (100) for feeding and dispensing a first fluid (A) in form of droplets towards:
   A group (200) for forming the uncured dosage forms, wherein a containing chamber (208) is provided for containing a bath of a second fluid (B), in contact with which the droplets of first fluid (A) undergo a consolidation process forming uncured dosage forms; and
   A conveying structure for conveying the second fluid (B) containing uncured dosage forms from the second fluid (B) containing chamber towards the maturation device (300) for curing the uncured dosage forms.

15. The machine according to claim 14, further comprising:
   A pre-treatment chamber (206) for said dispensed droplets, arranged downstream the dispensing group (100) and upstream the second fluid bath containing chamber (208) along the path of said dispensed droplets of first fluid (A), and
   A group (207) for providing an aerosol of a fluid inside the pre-treatment chamber (206), said fluid being suitable to determine at least a partial consolidation on the surface of said droplets dispensed inside the pre-treatment chamber.

16. The machine according to claim 14, wherein the feeding and dispensing group (100) comprises:
   A feeding reservoir (101) for containing the first fluid (A); and
   A feeding pump (104) for feeding the first fluid (A) from the reservoir (101) to a dispenser (102) of droplets, said droplets dispenser (102) comprising:
      a dripping chamber (102b) connected to the feeding pump and to one or more dispensing nozzles (102a) located downstream the dripping chamber (102b); and
      an electrostatic dripper (105) associated with one or more nozzles (102a).

17. The machine for producing dosage forms according to claim 16, wherein the dripping chamber (102b) is associated with a system (103) for generating a vibrational movement inside the chamber.

18. The machine for producing dosage forms according to claim 16, wherein the feeding pump of the feeding and dispensing group is of the Archimedean screw type.

19. The machine for producing dosage forms according to claim 16, wherein the pre-treatment chamber (206) is arranged underneath one or more nozzles (102a) along the vertical direction, and is formed by an upper part of a cylinder or conical frustum, and in that the chamber (208) for containing a bath of a second fluid (B) is contiguous to the pre-treatment chamber (206) and is formed by a lower part of the pre-treatment chamber (206) cylinder or conical frustum.

20. The machine for producing dosage forms according to claim 14, wherein the containing chamber (208) comprises a stirring system (209) able to stir said bath of the second fluid (B).

21. The machine according to claim 14, further comprising a recirculation system (314) for recirculating the second fluid (B), comprising a set of ducts that connect the maturation device with a fluid pump, which is in turn connected by means of further tubing with the containing chamber (208).

22. The machine according to claim 14, wherein the group for providing an aerosol inside the pre-treatment chamber (206) comprises at least one between:
   a nebulization system able to supply fluid (B) in the form of small droplets inside the pre-treatment chamber (206); and
   a bubbling system (2073) with a pumping means (2073a) able to blow a gas inside the bath of second fluid (B) contained in the forming chamber (208), through a duct (2073b) having its outlet end (2073c) submerged in said bath of second fluid (B), said blown gas thereby providing inside the pre-treatment chamber (206) an environment saturated by vapour of second fluid (B).

23. The machine according to claim 22, wherein the nebulization system comprises:
   a two-way atomizer (2071) with an aerosol feeding nozzle (2071) arranged in the pre-treatment chamber, wherein
   an outlet of a duct carrying the fluid to be dispensed, and
   an outlet of a duct feeding the nozzle with a gas able to break-up the flow of fluid to be dispensed are arranged at the feeding nozzle (2071a), thereby generating an aerosol formed as a finely divided spray of fluid; and/or
   a high pressure atomizer (2072), comprising a duct (2072b) through which the fluid to be dispensed is forcibly pumped by suitable pumping means to a feeding nozzle (2072a) having an outlet with cross-section significant smaller than the cross-section of the duct (2072b); and/or an ultra-sound nebulization system (2074).

24. The machine according to claim 22, wherein the nebulization system comprises:
   a sonication chamber (2074a), inside which the fluid to be nebulised is fed through a feeding duct (2074b),
   a vibratory motion transmission mechanism, for applying a vibratory motion to said fluid to be nebulized such that it becomes broken up in form of droplets,
   a feeding means for feeding a gas for delivery/dilution of said fluid droplets, and
   a discharge duct (2074d) that outflows into the pre-treatment chamber (206) and through which the delivery gas spreads the fluid droplets inside the pre-treatment chamber (206).

25. The machine according to claim 14, wherein the pre-treatment chamber (206) comprises an aperture connected to a pump, for controlling the pressure inside the pre-treatment chamber.

26. The machine for the production of dosage forms according to claim 14, wherein the first fluid (A) droplets dispensing group comprises a two-way nebulizer (2071) and/or an atomizer (2072).

27. A process for producing seamless dosage forms, comprising:
   Feeding a first fluid (A) from a reservoir to a dispensing group for dispensing droplets of the first fluid (A);
   Dispensing at least one drop of first fluid (A) towards a formation chamber containing a bath of a second fluid (B), arranged downstream the dispensing group;
   Submerging the at least one drop of first fluid (A) in said second fluid (B) bath for consolidating it externally and at least partially internally, and obtaining an uncured seamless dosage form; and
   conveying the uncured dosage form to a maturation device for curing uncured dosage forms, comprising:
   an external drum (310) with an upstream inlet (310b) for entrance of a fluid (B) containing uncured dosage forms, and a downstream outlet (310c) for discharging cured dosage forms;
   a first internal body (313) inside the drum, defining:
      at least one maturation chamber (313a) extending in the body between an upstream chamber inlet, in fluid communication with the inlet for uncured dosage forms in an open condition of the upstream chamber inlet, and a chamber downstream outlet, for establishing a fluid passage towards downstream and the discharge outlet, in an open condition of the chamber downstream outlet;

a first separation element, comprising:

a solid region for closing a downstream outlet of a chamber of the first internal body, and a passing-through region, able, in the chamber downstream outlet open condition, to open the chamber downstream outlet in order to allow passage of fluid towards downstream and the discharge outlet of the maturation device;

wherein at least the first internal body is rotatable around an own axis to determine the closing/opening condition of the downstream outlet of a maturation chamber of the first internal body; and a maturation step of the conveyed uncured seamless dosage form in the maturation device to obtain a cured seamless dosage form.

28. The process according to claim 27, wherein said first Fluid (A) and second fluid (B) are selected between a fluid containing a structuring substance, optionally a polymeric fluid, and a fluid containing a reagent for curing/crosslinking the said structuring substance, optionally a cationic fluid, wherein the second fluid is a fluid containing a reagent for curing/crosslinking the structuring substance of the first fluid if the latter is a fluid containing a structuring substance, or vice versa.

29. The process according to claim 27, further comprising:

providing a pre-treatment chamber arranged between the dispensing group and the chamber containing the second fluid (B) bath, the pre-treatment chamber being associated with a device for providing an aerosol of a fluid able to determine at least a partial consolidation on the surface of the at least one droplet dispensed inside the pre-treatment chamber; and providing an aerosol of said fluid in said pre-treatment chamber upon passage of said at least one dispensed droplet, thereby obtaining a dosage preform at least partially consolidated;

the first fluid droplet being submerged in the second fluid (B) bath, in the form of said pre-dosage form.

30. The process for producing dosage forms according to claim 27, wherein the obtained cured dosage form is coated with further substances and/or washed with an aqueous or organic solvent and/or dried in a maturation device.

31. The process for producing dosage forms according to claim 27, wherein feeding of the first fluid to be dispensed is done by means of a feeding pump (104) pumping the first fluid (A) from a reservoir (101) to a dripping chamber (102_b_) connected to the feeding pump and to one or more droplet dispensing nozzles (102_a_) of the dispensing group, and in that said dispensing step comprises dispensing said one or more droplets from said dripping chamber by means of said one or more nozzles (102_a_), wherein the droplets exiting from one or more nozzles go through an electrostatic dripper and are thereby charged with an electrostatic charge located on their own surface;

wherein, optionally, a vibrational movement is generated inside the dripping chamber (102).

32. The process for producing dosage forms according to claim 27, wherein the bath of second fluid (B) contained inside the forming chamber (208) is stirred by a stirring system (209); and/or wherein a fluid (B) drawn from the maturation device is recycled to the forming chamber by a set of ducts that connect the maturation device with a fluid pump, which is in turn connected by means of further tubing with the forming chamber (208) containing the bath of second fluid for forming dosage forms.

33. The process for producing dosage forms according to claim 29, wherein providing an aerosol inside the pre-treatment chamber (206) is effected by means of:

a nebulization system able to supply fluid (B) in the form of small droplets inside the pre-treatment chamber (206) and/or blowing a gas inside the bath of second fluid (B) contained in the forming chamber (208) by means of a pumping device (2073_a_), thereby providing an environment saturated by vapour of second fluid (B) inside the pre-treatment chamber (206); And/or an ultra-sound nebulization system (2074) with a sonication chamber (2074_a_) to which the fluid to be nebulised is fed;

in that a vibratory motion is applied to said fluid to be nebulised such that it becomes broken up in form of droplets, and in that a delivery/dilution gas for diluting and delivering said fluid droplets is fed to the sonication chamber, and spreads the fluid droplets inside the pre-treatment chamber (206) through a discharge duct (2074_d_).

34. The process according to claim 28, wherein the fluid containing a curing/crosslinking reagent contains one or more of the following crosslinking substances dispersed or solubilized therein: glutaraldehyde, ammonia, acetic acid, dibenzoyl peroxide, potassium ($K^+$), Ferric ($Fe^{+2}$), Barium ($Ba^{+2}$), Sodium ($Na^+$), Magnesium ($Mg^{+2}$), Aluminium ($Al^{+3}$), Zinc ($Zn^{+2}$) cations, or any chemically acceptable salt thereof; and/or wherein the fluid containing a structuring substance contains, dispersed or solubilized therein, one or more structuring substance selected from a group consisting of: Alginate, Kitosan, Fibrin, Collagen, laluronic Acid, Dextran, a chemically acceptable salt and/or derivative thereof;

or from the group consisting of: ethylene, propylene, vinyl cloride, acrylic acid and derivatives thereof.

35. The process according to claim 27, wherein the process is continuously producing cured dosage forms.

* * * * *